Oct. 23, 1934.  J. A. BOLL  1,978,038
SLIDE RULE
Filed April 15, 1933
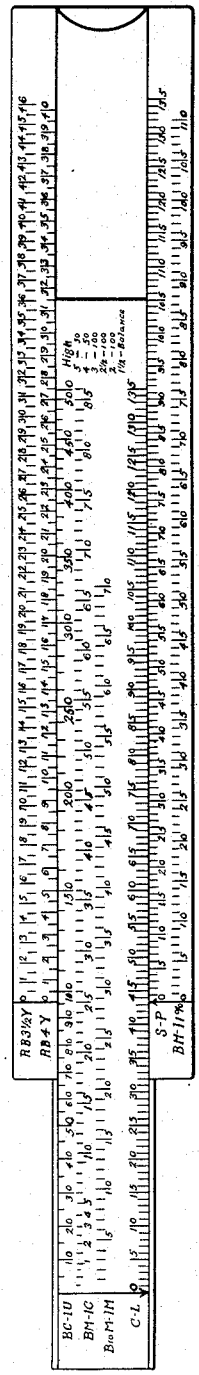
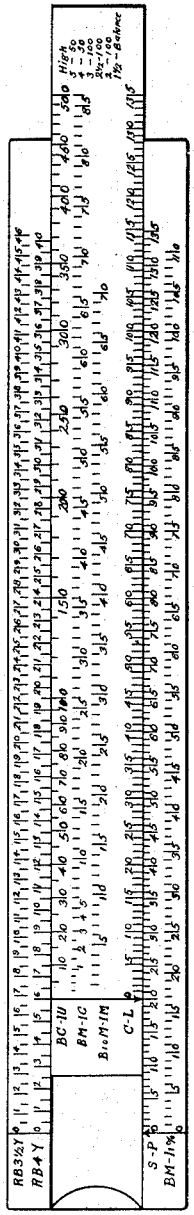
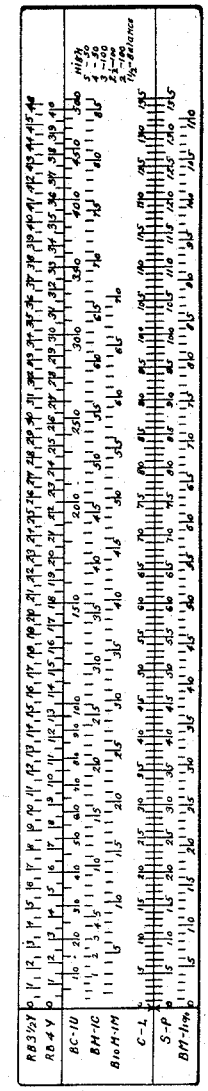
INVENTOR.
John A. Boll
BY
Fay, Oberlin & Fay
ATTORNEYS.

Patented Oct. 23, 1934

1,978,038

UNITED STATES PATENT OFFICE 1,978,038

SLIDE RULE

John A. Boll, Cleveland, Ohio

Application April 15, 1933, Serial No. 666,292

6 Claims. (Cl. 235—70)

This invention relates as indicated to slide rules and more particularly to a slide rule designed for use in analyzing commercial accounts of financial institutions such as banks.

It is among the objects of my invention to provide a slide rule or calculating instrument from which any information with regard to the analysis of a particular account may be obtained instantly and without lengthy computation to determine whether an account which the bank has or is contemplating accepting will be a profitable or unprofitable business to the bank.

Other objects of my invention will appear as the description proceeds.

To the accomplishment of the foregoing and related ends, said invention, then consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Figure 1 is a plan view of one face of a slide rule constructed in accordance with the principles of my invention; Figures 2 and 3 are respectively different settings of the rule denoting the manner in which accounts operating under different conditions may be analyzed; and Figure 4 is a transverse sectional view of the slide rule illustrated in the previous figures.

The calculating instrument comprising my invention is designed, as previously indicated, for use in analyzing commercial accounts of banking institutions in order to arrive at certain information which may be briefly outlined as follows:—

1. The cost of handling any number of items on the basis of a plurality of sets of costs.

2. The yield on any balance at a plurality of rates.

3. The interest payable on any balance at any rate.

4. The number of items any balance will support.
   (a) Without interest on the account.
   (b) Without interest but with a percentage of profit to the bank.
   (c) With interest at any rate.
   (d) With interest at any rate and a percentage of profit to the bank.

5. The balance necessary to support any number of items.
   (a) Without interest on the account.
   (b) Without interest but with a percentage of profit to the bank.
   (c) With interest at any rate.
   (d) With interest at any rate and a percentage of profit to the bank.

6. The profit or loss on any balance with any activity.
   (a) Without interest on the account.
   (b) With interest at any rate.

7. The equitable charge that should be made on any account not maintaining a compensatory balance.

8. When accepting a new account—
   (a) Whether the account will be profitable or unprofitable.
   (b) Whether the account warrants the payment of interest at prevailing rates.
   (c) What balance should be carried with the proposed activity, if no interest is desired.
   (d) What balance should be carried with the proposed activity, if interest is requested.
   (e) What balance should be carried with proposed activity, no interest desired, but a percentage of profit to the bank.
   (f) What balance should be carried with proposed activity, interest requested, and a percentage of profit to the bank.

Preliminary to an explanation of the manner in which the slide rule calculator comprising my invention may be employed in manipulating for the purpose of arriving at any of the above indicated results, a brief explanation of the several scales on the instrument will first be given, prior to the specific description of each scale.

Scale RB—4Y is a regularly calibrated scale, that represents realized balances maintained by an account. Scale S—P is a regularly calibrated scale, that represents one month's earning power on the balances opposite on scale RB—4Y. Scale C—L is a regularly calibrated scale identical to S—P. Scale BC—IU; BM—IC; and B10M—IM are non-logarithmic scales whose calibrations are a decreasing variable. These calibrations are based on graded scales of costs and are placed in juxtaposition with the corresponding costs on scale C—L.' On the high scale these positions would be based on the following schedule of costs.—Five cents for the first fifty items; four cents for the next fifty items; three cents for the next hundred items; two and one-half cents for the next hundred items; two cents for the next hundred items and one and one-half cents for the balance of the items.

Scale BM—I 1% is a regularly calibrated scale and represents one month's interest at 1% on the scale S—P in thousands of dollars.

RB—3½Y, RB—4Y, RB—4¼Y and RB—4½Y are scales that represent the realized balances maintained by customers, and are used according to the periodic net earning power of the bank upon its invested funds, that is if a bank is earning 4%, the RB—4Y is used. These scales may be referred to as the upper stationary scales and have equal calibrations. Any point on these scales may be used as a balance in hundreds of dollars, thousands of dollars, and ten thousands of dollars.

Thus, the point 5 may represent—

| | |
|---|---|
| Five hundred dollars | $500.00 |
| Five thousand dollars | $5,000.00 |
| Five ten thousand dollar | $50,000.00 |

BC—IU, BM—IC and B10M—IM are scales that represent the number of items collected and paid for a customer during the period of a month. On the three scales can be found any number of items from one item to seventy thousand items.

BC—IU denotes balances in hundreds, items in units. The meaning of this designation is that the scale is an item scale divided into single items and when this scale is operated against the balance scale as RB—4Y, the balance scale is used as hundreds of dollars. Thus, the point 40 on scale BC—IU placed opposite the point 8 on the scale RB—4Y would mean 40 items on an account that maintains a balance of 8 hundred dollars. This scale has calibrations that are non-logarithmic which progressively decrease.

BM—IC denotes balance in thousands, items in hundred. The meaning of this designation is that the scale is an item scale divided into hundreds of items and when this scale is operated against the balance scale RB—4Y, the balance scale is used as thousands of dollars. Thus, the point 20 on scale BM—IC placed opposite the point 15 on scale RB—4Y would mean 20 hundred or 2000 items on an account that maintains a balance of 15 thousand dollars. This scale has calibrations that are non-logarithmic which progressively decrease in the first portion thereof, that is from zero to 10, but thereafter the remaining calibrations are equal.

B10M—IM denotes balances in ten thousands, items in thousands. The meaning of this designation is that the scale is an item scale divided into thousands of items and when this scale is operated against the balance scale RB—4Y the balance scale is used as ten thousands of dollars. Thus, the point 15 on B10M—IM placed opposite the point 19 on scale RB—4Y would mean 15 thousand items on an account that maintains a balance of 19 ten thousands of dollars, or $190,000.00. This scale has calibrations that are for the most part equal to each other and to the beforementioned remaining calibrations in the scale BM—IC.

C—L. The scale C—L represents the cost in dollars of the number of items directly opposite any point on the items scale, or when the slide is moved to the left side this scale represents the loss in dollars on the account analyzed. The calibrations of this scale are equal to each other and bear a fractional relationship to the scale RB depending upon the rate of interest.

S—P. The scale S—P represents the service in dollars that can be rendered for the balance directly opposite any point on the RB scale, or when the slide is moved to the right, this scale represents the profit in dollars on the account analyzed. This scale has calibrations that are equal to each other and to those of the adjacent C—L scale, and may be denoted the lower stationary scale.

The scales C—L and S—P are read as printed when using the balances in thousands of dollars or the items in hundreds. Thus, the point 25 would read $25.00.

When using the balances in hundreds or the items in units, these scales are read with a decimal one point to the left. Thus, the point 25 would read $2.50.

When using the balances in tens of thousands of dollars or the items in thousands, these scales are read with a decimal one point to the right. Thus, the point 25 would read $250.00.

BM—I 1% denotes balances in thousands, interest at 1%. The meaning of this designation is that the scale is the interest in dollars at 1% for one month on the balances in thousands of dollars as shown on the scale S—P. Thus, the point 20 on scale BM—I 1% directly opposite the point 24 on scale S—P means twenty dollars is the interest at 1% for one month on 24 thousand dollars.

With the above explanation of the different scales on the several relatively fixed and relatively movable parts of the rule in mind, an explanation of the manner in which the enumerated results or information obtainable by use of such scale will now be briefly outlined.

I. Cost of Handling Any Number of Items

In order to arrive at this result the scales on the slide portion of the instrument only are necessary. The scale C—L represents the cost of the items. The scales BC—IU; BM—IC; and B10M—IM, respectively designate the number of items in units, hundreds and thousands.

On the scale BC—IU

Note that the decimal is moved one point to the left in reading scale C—L, when dealing with items in units.

The point 20   20 items, cost $1.00 on scale C—L
The point 50   50 items, cost $2.50 on scale C—L
The point 100  100 items, cost $4.50 on scale C—L
The point 150  150 items, cost $6.00 on scale C—L On the scale BM—IC Note that the decimal is in its normal position on scale C—L when dealing with items in hundreds.

The point 3    3 hundred items 300, cost $10.00 on scale C—L
The point 10   10 hundred items 1000, cost $21.00 on scale C—L
The point 15   15 hundred items 1500, cost $28.50 on scale C—L
The point 25   25 hundred items 2500, cost $43.50 on scale C—L On the scale B10M—IM Note that the decimal is moved one point to the right in reading scale C—L, when dealing with items in thousands.

The point 5    5 thousand items 5000, cost $81.00 on scale C—L
The point 10   10 thousand items 10000, cost $156.00 on scale C—L
The point 15   15 thousand items 15000, cost $231.00 on scale C—L
The point 20   20 thousand items 20000, cost $306.00 on scale C—L

II. The Yield on Any Balance at a Given Rate

In the drawing only one face of the rule is shown. Along the top portion of the rule, i. e., the stationary part, are indicated two scales RB—3½Y and RB—4Y denoting that these scales have been constructed respectively on the basis of 3½% and 4% yield on the realized balance. The rule may be widened to permit the inclusion of other scales based on different percentages of yield although it will probably be more convenient to arrange the scales for the different percentages of yield on the back of the rule, thereby keeping the size of the rule down to a point where it may be conveniently handled. In order to determine the yield on any balance at the particular rate on which the RB scales are based, only the stationary portion of the rule is needed. The scale S—P represents the service in dollars that can be performed for any balance on the scales RB. The scale S—P is in its normal position as printed, when used against balances in thousands of dollars. When used in balances in hundreds of dollars, the decimal is moved one point to the left; when using balances in tens of thousands of dollars, the decimal is moved one point to the right.

On the scale RB—4Y

The point 3—
3 hundred dollars $300 will permit a service costing $1.00, scale S—P
3 thousand dollars $3,000 will permit a service costing $10,000, scale S—P
3 ten thousand dollars $30,000 will permit a service costing $100.00, scale S—P
The point 12—
12 hundred dollars $1,200 will permit a service costing $4.00, scale S—P
12 thousand dollars $12,000 will permit a service costing $40.00, scale S—P
12 ten thousand dollars $120,000 will permit a service costing $400.00, scale S—P

On the scale RB—3½Y

The point 24—
24 hundred dollars $2,400 will permit a service costing $7.00, scale S—P
24 thousand dollars $24,000 will permit a service costing $70.00, scale S—P
24 ten thousand dollars $240,000 will permit a service costing $700.00, scale S—P

III. The Interest Payable on Any Balance at Any Rate

For this operation only the lower portion of the rule is necessary. The scale S—P is used as the balance scale in thousands; the scale BM—I 1% is the monthly interest on the balances at 1%. Thus, we have—

The point 12 on scale S—P $12,000. Interest at 1% is $10.00. Scale BM—I 1%
The point 18 on scale S—P $18,000. Interest at 1% is $15.00. Scale BM—I 1%
The point 24 on scale S—P $24,000. Interest at 1% is $20.00. Scale BM—I 1%

By moving the decimal one point to the right or to the left in the principal, it is quite plain that the answer will be correct if the decimal is moved in the same direction for the interest. Thus, we have—

The point 18 on scale S—P $1,800. Interest at 1% is $1.50. Scale BM—I 1%
The point 18 on scale S—P $180,000. Interest at 1% is $150.00. Scale BM—I 1%
The point 24 on scale S—P $2,400. Interest at 1% is $2.00. Scale BM—I 1%
The point 24 on scale S—P $240,000. Interest at 1% is $200.00. Scale BM—I 1%.

With the interest given at 1%, it is easy to determine the interest at the prevailing rate for any given bank by reducing either the principal or the interest to the prevailing rate.

Thus, if the prevailing rate is 1½% and the principal $18,000, the correct answer can be obtained either by determining the interest on 1½ times $18,000, or by taking 1½ times $15.00. In either case, the interest would be $22.50.

IV. The Number of Items Any Realized Balance Will Support (a) Without interest on the account.

For this operation the upper stationary portion and the slide are necessary. The scale "RB—any % Y" represents the realized balance maintained. The scales opposite these balances on the slide will give the number of items supported.

When the slide is centered with respect to the stationary scales as illustrated in Fig. 1, the rule indicates the position of no profit or no loss on the account, or what activity any balance will carry without profit or loss. Thus—

On scale RB—4Y

The point 3—
3 hundred dollars $300 will support a 20 item activity—BC—IU
3 thousand dollars $3,000 will support a 300 item activity—BM—IC
3 ten thousand dollars $30,000 will support a 6,250 item activity—B10M—IM The point 18—
18 hundred dollars $1,800 will support a 150 item activity—BC—IU
18 thousand dollars $18,000 will support a 3,600 item activity—BM—IC
18 ten thousand dollars $180,000 will support a 40,000 item activity—B10M—IM

On scale RB—3½Y

The point 12—
12 hundred dollars $1,200 will support a 75 item activity—BC—IU
12 thousand dollars $12,000 will support a 1,925 item activity—BM—IC
12 ten thousand dollars $120,000 will support a 23,000 item activity—B10M—IM (b) Without interest but with a percentage of profit to the bank.
(c) With interest at any rate.
(d) With interest at any rate, and a percentage of profit to the bank.

The settings for these three operations are performed in the same manner. First determine what the profit or interest at a given rate on the balance must be, as set forth in explanations under "No. 3."

(b) Thus, suppose the bank wishes to make a profit of 1%: Determine the interest at 1% on the given balance, for example a $24,000.00 balance would necessitate a $20.00 profit on the account if the bank wishes to make 1% on the balance maintained. Move the arrow on the slide until it is directly opposite the point 20 on the scale "S—P" and opposite the point 24 on scale "RB—4Y"; read on the scale BM—IC, 3,600 items, as shown in Fig. 2.

(c) It is very evident that the same setting would apply if the customer is to receive 1% on his balance and the bank to make no profit on the account. Should the prevailing interest rate be 1½%, the arrow on the slide should be placed opposite the point 30. In this instance $24,000.00 will support 2,925 items.

(d) If interest at the prevailing rate of 1% is to be paid, and the bank is to make a 1% profit on the account, we would have a total profit requirement of 2% on the balance maintained, or a $40.00 profit necessary on the account. The arrow on the slide is accordingly moved opposite the point "40" on the scale "S—P," and in this case $24,000.00 will support 2,275 items.

Should the prevailing rate be 1½%, and the profit desired 1%, the account would be obliged to carry a $50.00 profit. The arrow on the slide is accordingly moved opposite 50 on scale "S—P," and in this case, $24,000.00 will support 1,600 items.

V. THE BALANCE NECESSARY TO SUPPORT ANY NUMBER OF ITEMS (a) Without interest on the account.

This problem is the inverse of "4—a". For this operation the slide and the upper stationary portion of the rule are necessary. The balance on scale RB any % Y opposite any given activity is the balance necessary to support that activity. The slide rule at center as shown in Fig. 1, indicates the position of no profit or loss on the account, or what balance is necessary to support any activity without profit or loss. Thus—

On the scale BC—IU

A 30 item activity requires 4½ hundred dollars $450.00 balance, scale RB—4Y
A 100 item activity requires 13½ hundred dollars $1,350.00 balance, scale RB—4Y
A 150 item activity requires 18 hundred dollars $1,800.00 balance, scale RB—4Y On the scale BM—IC A 3 hundred (300) item activity requires 3 thousand $3,000 bal., RB—4Y
A 16 hundred (1,600) item activity requires 9 thousand $9,000 bal., RB—4Y
A 30 hundred (3,000) item activity requires 15¼ thousand $15,250 bal., RB—4Y On the scale B10M—IM A 3 thousand item activity requires 1½ ten thousand $15,000, bal., RB—4Y
A 15 thousand item activity requires 7 ten thousand $70,000, bal., RB—4Y
A 30 thousand item activity requires 13½ ten thousand $135,000, bal., RB—4Y (b) Without interest, but with a percentage of profit to the bank.
(c) With interest at any rate.
(d) With interest at any rate and a percentage of profit to the bank.

The settings for these three operations are performed in the same manner, because in every instance we have a certain percent of profit to be obtained from the balance, in order to pay for the interest or profit desired. In this case, however, the balance being the unknown quantity, the amount of interest cannot be pre-determined from the balance; it must, therefore, be determined from some other factor.

The exact position of the slide can be figured for any rate, and any yield by the following formula:

$$\frac{\text{Interest rate}}{\text{Yield rate minus interest rate}} \text{ times cost of the activity}$$

This may seem complicated at first sight, but it is very simple in actual operation, as the first factor remains the same in a given bank, unless there is some change in the interest or yield rate. Assuming that the interest rate in a given bank is 1½% and that the profit desired by the bank on accounts is 1%, and the yield being used is 4%, we would have for an account—

(b) Where a profit only is desired:

$$\frac{1}{4-1} \times \text{cost, or } \tfrac{1}{3} \times \text{cost}$$

(c) Where interest only is required:

$$\frac{1\tfrac{1}{2}}{4-1\tfrac{1}{2}} \times \text{cost, or } \frac{3/2}{5/2} \times \text{cost or } 3/5 \times \text{cost}$$

(d) Where interest and profit are desired:

$$\frac{2\tfrac{1}{2}}{4-2\tfrac{1}{2}} \times \text{cost, or } \frac{5/2}{3/2} \times \text{cost or } 5/3 \times \text{cost}$$

These factors should ordinarily be determined by the accountants in the bank and will remain the same until there is a change in the yield on funds, the interest paid on balances maintained, or the profit desired. Thus, in the example listed above, where the yield is 4%, the prevailing interest rate 1½% and the profit desired 1%, we would always have for—

(b) ⅓ × cost of the activity.
(c) ⅗ × cost of the activity.
(d) 5/3 × cost of the activity.

(b) Without interest, but with a percentage of profit to the bank.
(c) With interest at any rate.
(d) With interest at any rate and a percentage of profit to the bank.

Assuming that we have an account with 3600 items, and wish to know what balance should be maintained in order to carry that activity if a profit of 1% is to be made for the bank, and the prevailing yield rate is 4%, we would first determine the cost of 3600 items and find it to be $60.00. Then according to the formula, we would have—

⅓ of $60.00 equals $20.00

We would, therefore, have to make a profit of $20.00 on this account to meet these conditions. The arrow on the slide is accordingly placed opposite the point 20 on scale S—P as shown in Fig. 2, and opposite the point 36 on scale BM—IC, we would read $24,000.00 on RB—4Y. The correctness of this operation can be proved by determining one month's interest on $24,000.00 which will be $20.00, exactly the amount of the profit made.

An account with 2600 items which cost $45.00 to handle, would show the following result:

(b) Profit only, ⅓ × 45 equals $15.00. Balance $18,000.00
(c) Interest only, ⅗ × 45 equals $27.00. Balance $21,500.00
(d) Interest and profit, 5/3 × 45 equals $75.00. Balance $36,000.00

These balances are read on RB—4Y opposite the point 26 on BM—IC, after sliding the arrow on C—L opposite the points 15, 27 and 75, respectively, on scale S—P.

An account with 1600 items which cost $30.00 to handle, would show the following result:

(b) Profit only, ⅓ × 30 equals $10.00. Balance $12,000.00

(c) Interest only, ⅗ × 30 equals $18.00. Balance $14,500.00
(d) Interest and profit, 5/3 × 30 equals $50.00. Balance $24,000.00

These balances are read on RB—4Y opposite the point 16 on BM—IC, after sliding the arrow on C—L opposite the points 10, 18 and 50, respectively, on scale S—P.

VI. THE PROFIT OR LOSS ON ANY BALANCE WITH ANY ACTIVITY (a) Without interest on the account.

The answers for these problems are obtained by sliding the number of items directly opposite the balance maintained and reading the point opposite the arrow on scale S—P, for any profit on the account, and the point opposite the arrow on scale C—L for any loss on the account. Thus, by placing the point 150 on scale BC—IU opposite the point 24 on RB—4Y, as illustrated in Fig. 2 we have—

A $2,400 account, scale RB—4Y with 150 items scale BC—IU, a profit of $2. S—P
A $24,000 account, scale RB—4Y, with 3600 items scale BM—IC, a profit of $20. S—P
A $240,000 account, scale RB—4Y, with 39,750 items scale B10M—IM, a profit of $200. S—P By placing the point 150 on scale BC—IU, opposite the point 5 on RB—4Y, as illustrated in Fig. 3, we have—

A $500 account, scale RB—4Y, with 150 items scale BC—IU, a loss of $4.30, C—L
A $5,000 account, scale RB—4Y, with 3,600 items scale BM—IC, a loss of $43.00, C—L
A $50,000 account, scale RB—4Y, with 39,600 items scale B10M—IM, loss of $430.00. C—L (b) With interest at any rate.

The profit or loss on any account, bearing interest at the prevailing rate, is determined in the same manner as on accounts without interest. The interest is then determined on the balance maintained. If the account shows a profit before interest payment, the interest paid is deducted from the profit, and thus a net profit, or a net loss is obtained. If the account shows a loss prior to interest payment, the interest paid is added to the loss and the figure thus obtained is the total loss on the account.

VII. THE EQUITABLE CHARGE THAT SHOULD BE MADE ON ANY ACCOUNT NOT MAINTAINING A COMPENSATORY BALANCE

This operation is intended for banks desiring to make an equitable service charge on accounts that show them a loss. It is very evident that this operation is performed exactly like the operation of No. VI, and is intended only for accounts showing a loss.

The equitable service charge for any account is the loss sustained by the bank on that account. Thus, we have—

A $500 account with 150 items, should be charged at least $4.30
A $5,000 account with 3,600 items, should be charged at least $43.00
A $50,000 account with 39,600 items, should be charged at least $430.00

This method of making a service charge in no way prevents a bank from making a minimum charge under certain conditions, or if not making a charge until the loss has reached a point at which the service charge should become effective.

Thus, there may be a minimum charge of $1.00 for accounts not maintaining a required balance. In this case, the figures on the slide rule would become effective only after the account has exceeded the minimum charge.

Likewise a regulation such as not making a charge until the loss has exceeded a stipulated amount may be made operative. Thus, it may be advisable not to charge an account until the loss has reached 25¢. In this case, the service charge for the loss sustained would become operative only when it has exceeded the stipulated amount.

As previously indicated, only one face of the rule and one face of one of the slides has been illustrated. The reverse face of the rule may be provided with different base scales of realized balances at different percentages of yield. Furthermore, the various faces of the several slides will have the scales arranged thereon based on different costs per unit of items. The illustrated slide is based on the cost of the items as defined by the table at the right hand end of the slide, namely 5¢ for the first 50; 4¢ for the next 50; 3¢ for the next 100 etc. The several slides, as well as the 100 different faces of each slide may be employed interchangeably with different faces of the rule making possible 48 settings all operated in the same manner to suit the needs and conditions of any type of banking institution.

Other modes of applying the principle of my invention may be employed instead of the one explained, change being made as regards the mechanism herein disclosed, provided the means stated by any of the following claims or the equivalent of such stated means be employed.

I, therefore, particularly point out and distinctly claim as my invention:

1. In a slide rule having a fixed member and a slidable member, a plurality of scales arranged thereon, including a stationary scale having equal calibrations arranged on one part of said fixed member, a datum line on said slidable member, a non-logarithmic scale on said slidable member cooperating with said stationary scale and calibrated in progressively decreasing calibrations from said datum line, and a second stationary scale of uniform calibrations arranged on another part of said fixed member, to cooperate with the non-logarithmic scales.

2. In a slide rule having a fixed member and a slidable member, a uniformly calibrated stationary scale on a part of said fixed member, a datum line on said slidable member, a non-logarithmic scale on said slidable member, of progressively decreasing calibrations from said datum line, cooperating with said stationary scale, and a second scale of uniform graduations arranged on said slidable member to cooperate with said non-logarithmic scale.

3. In the structure in claim 2, in combination with an index line on said fixed member, for cooperation with the uniform scale on the slide member.

4. In the structure in claim 1, said datum line on the slide member cooperating with the second stationary scale on the fixed member.

5. In a slide rule having a fixed member and a slidable member, a uniformly graduated scale on a part of said fixed member, a non-logarithmic scale of progressively decreasing calibrations on said slidable member, a second uniformly graduated scale on said slidable member, adjacent said logarithmic scale, an index line on said slidable member, a third uniformly graduated scale on another part of said fixed member, and a fourth uniformly graduated scale, arranged adjacent said third uniformly graduated scale on said fixed member.

6. A slide rule having a fixed member and a slidable member, a stationary uniformly graduated scale on said fixed member, a plurality of related non-logarithmic scales on said slidable member, of progressively decreasing calibrations, cooperating with said stationary scale, and a second uniformly calibrated stationary scale on said fixed member cooperating with any of said non-logarithmic scales.

JOHN A. BOLL.